US006427866B1

(12) United States Patent

Hawker et al.

(10) Patent No.: US 6,427,866 B1

(45) Date of Patent: Aug. 6, 2002

(54) CAN FOOD DISPENSER

(76) Inventors: Scott G. Hawker, 951 W. 250 South, Blackfoot, ID (US) 83221; Paul R. Petersen, 265 Richmond Cir., Idaho Falls, ID (US) 83404

( * ) Notice: Subject to any disclaimer, the term of this patent is extended or adjusted under 35 U.S.C. 154(b) by 9 days.

(21) Appl. No.: 09/630,106

(22) Filed: Aug. 1, 2000

(51) Int. Cl.7 ................................................ B65G 59/00

(52) U.S. Cl. ....................................... 221/132; 221/241

(58) Field of Search ................................ 221/132, 131, 221/92, 241, 67; 312/42, 45, 72, 73

(56) References Cited

U.S. PATENT DOCUMENTS

| | | | | | |
|---|---|---|---|---|---|
| 1,221,217 | A | * | 4/1917 | Quinliven et al. | 221/132 |
| 1,694,897 | A | | 12/1928 | Washburn | 221/198 |
| 3,010,606 | A | | 11/1961 | Heselov | 221/92 |
| 4,986,615 | A | * | 1/1991 | Hieb et al. | 312/45 |
| 5,529,207 | A | * | 6/1996 | Oden et al. | 312/45 |

* cited by examiner

*Primary Examiner*—Kenneth W. Noland

(74) *Attorney, Agent, or Firm*—Hopkins Roden Crockett Hansen & Hoopes, PLLC

(57) ABSTRACT

A vertically stored can dispenser having the capability to retain multiple size food cans and provide easy access to the various size can channels. The dispenser can be attached to a lazy susan rotary base or attached to a slide-out cabinet dispenser device. The multiple size can channels can be interchanged.

9 Claims, 11 Drawing Sheets

CAN FOOD DISPENSER

TECHNICAL FIELD

This invention relates in general to a vertically stored can dispenser having the capability to retain multiple size food cans and provide easy access to the various size can channels. The dispenser can be attached to a lazy susan rotary base or attached to a slide-out cabinet dispenser device. The multiple size can channels can be interchanged.

BACKGROUND OF THE INVENTION

Accessible storage of cans of various sizes can be difficult due to the different can sizes. Some of the different sizes of cans are listed in the following table:

| Type of Can | Length in Inches | Diameter in Inches |
|---|---|---|
| Tuna Fish | 1½" | 3⅜" |
| Soup (small) | 4" | 2⅝" |
| Bean | 4½" | 3" |
| Juice (large) | 7" | 4¼" |

It would be handy to have interchangeable can storage devices that provide easy access to the oldest cans, whether for home use or commercial use.

SUMMARY OF THE INVENTION

This invention relates to dispensers in general, and it particularly relates to dispensers for can articles such as, Campbell soup, tuna, fruits, beans, juices in large cans etc. In one specific aspect, the present invention is directed to dispensers for home use for stored can goods.

Notwithstanding the variety of available dispensers and vending machines, so far as it is known, there is no simple and economical dispenser for dispensing and rotating a variety of different sizes and shapes of cans and like articles for use in various home, restaurant, stores, RVs and etc.

Accordingly, it is a general object of this invention to provide such dispensers which are relatively small, compact and easy to use in home, restaurants, RVs, storage areas and thus constitute another staple home, kitchen, store, RV and storage product. The dispensers can be rotary mounted, cabinet mounted, on-wall mounted and in-wall mounted for storage.

It is therefore an object of the present invention to provide a display and rotating dispenser which is completely versatile in that it can be readily adjusted to accommodate various quantities of various size merchandise, including cans, boxes, bottles, etc.

It is another object of the invention to provide such a device wherein the chambers which accommodate stacks of merchandise containers are adjustable in the width and in the depth so the containers in each stack are maintained in a neat vertical arrangement and the front faces of substantially all the containers in all the stacks are maintained in a flush relationship.

It is a further object of the invention to provide such a device in which partitions, defining the chambers for accommodating the stacks of merchandise, may be maneuvered into a variety of positions of adjustment without the need of many tools or special skills.

It is still another object of the invention to provide such a device wherein the lower most container in each stack is automatically moved down to partially remove it from beneath the stack so as to facilitate its complete removal when needed for use or sale.

Although the display and dispenser of this invention has been described above, in connection with its contents, it is to be understood that the invention has much wider utility and may be used in any situation in which multiple size containers are to be stored and dispensed.

DETAILED DESCRIPTION OF THE INVENTION

Figure 1:
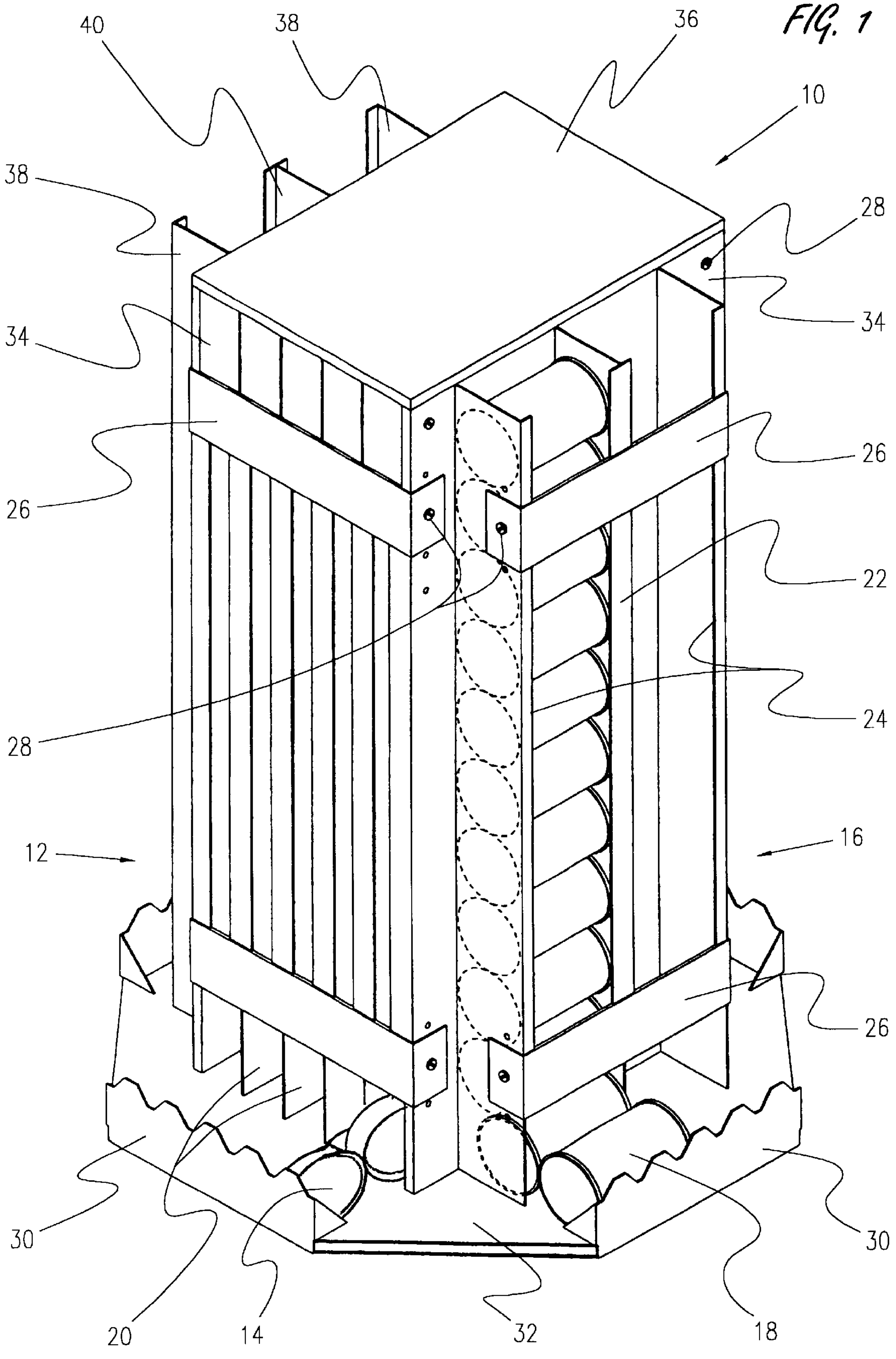
FIG. 1 is a front isometric view of the can dispenser.

FIG. 1 illustrates a first embodiment of a lazy susan can dispenser 10. This adaptable dispenser front view shows at the front left, a configuration 12 for tuna fish-sized cans 14. On the right side a configuration 16 shows soup-sized cans 18. The cans are vertically retained by the adjustable T-shape spacer panels 20 and 22. The angle-shaped end panels 24 are held in place by panel braces 26 attached by fasteners 28. The cans are prevented from falling by roll stop plate 30 attached to base 32. The spacer panels 22 and 24 are supported by a double-walled support panel 34 and base 32. Top cap 36 is fastened to the double-walled support panels by fasteners 28. On the back side of the dispenser 10 the soup-sized can end panels 38 and spacer panel 40 can be seen.

Figure 2:
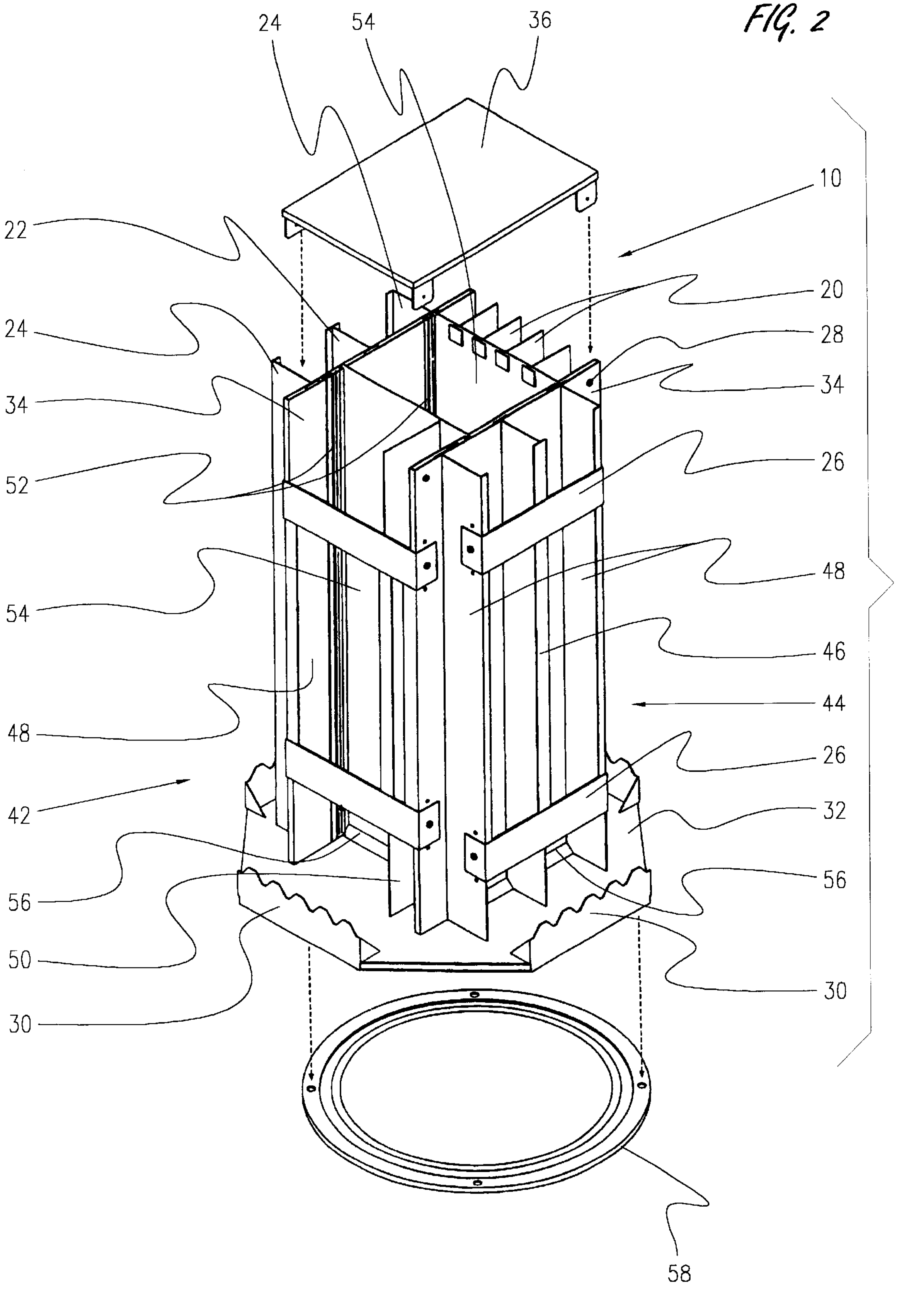
FIG. 2 is a rear isometric view of the can dispenser.

FIG. 2 shows the backside of dispenser 10 revealing a large juice can holder 42 on the left and the soup can holder 44 on the right. In this case, the spacer panel 22 and end panel 24 for bean cans has a greater depth than the soup can spacer panel 46 and end panels 48 due to difference in can size. Adjacent to the juice can holder 42 is a section for the small tuna cans 50.

This expanded view reveals the multiple vertical slots 52 that retain the side edges of support panels 54. These slots 52 accommodate the panels 54 for juice, tuna and soup or bean cans. At the bottom of the support panels 54 are roll guides 56. The dispenser 10 is mounted on lazy susan assembly 58.

Figure 3:
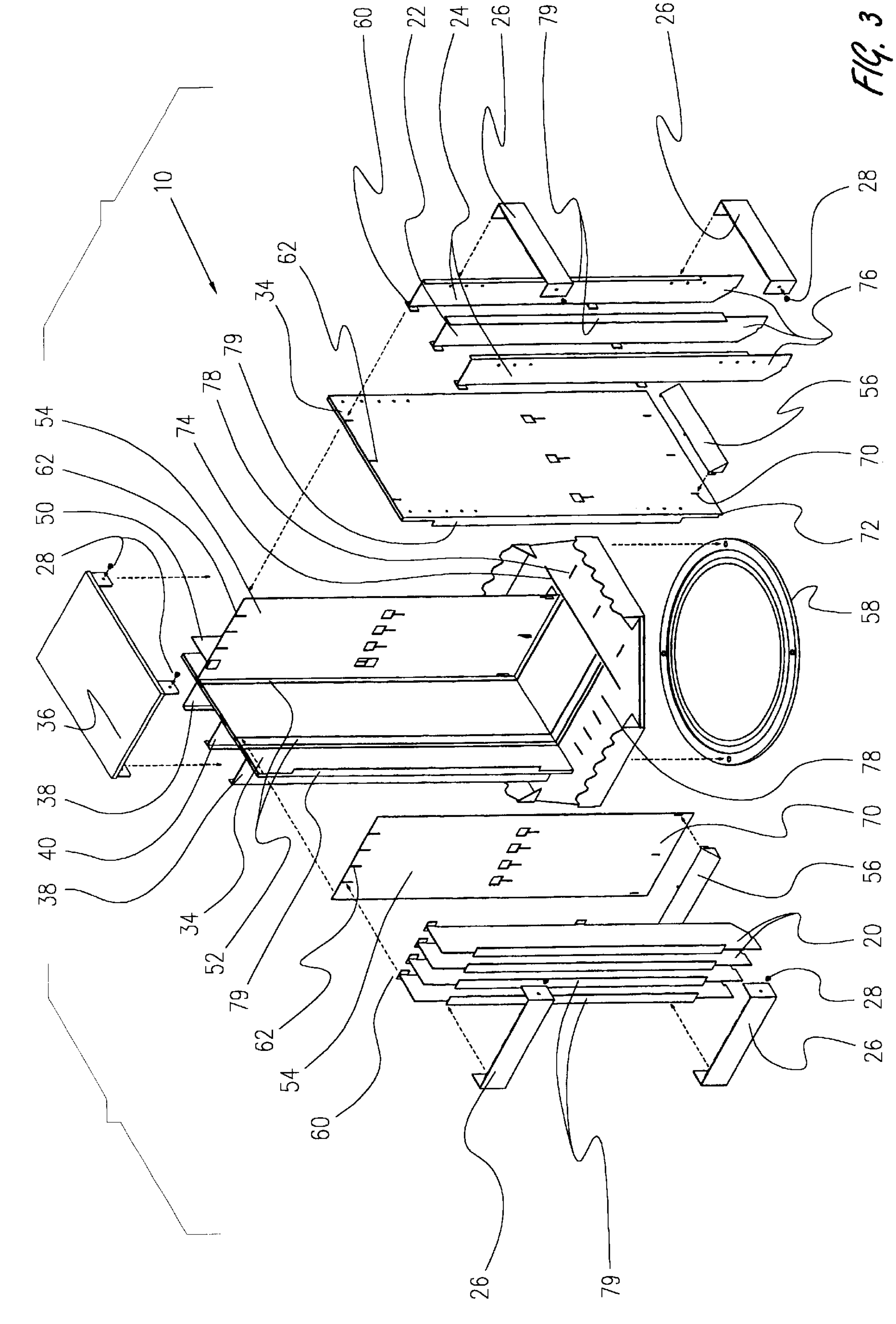
FIG. 3 is an exploded view of the can dispenser.

FIG. 3 illustrates an exploded isometric view of the internal and interchangeable parts of dispenser 10. The T-shape spacer panel 22 and angle-shape end panels 24 are affixed to the double-walled panel 34 by sliding the protruding ears 60 over and down through slots 62 in the panel 34. These panels form a channel section that holds the cans. The roll guides 56 attach to the double-walled panel at slots 70. The panel 34 attaches to base 32 by a panel extension 72 that fits within base slot 74. Panels 22 and 24 have panel tabs 76 that slide into base tab slots 78. In a similar fashion, spacer panels 20 and 50 attach to support panels 54 which connect to base 32. A lip 79 on panels 20, 22, 24 and support panel 34 form a can retainer on these channel and angle shape sections.

Figure 4:
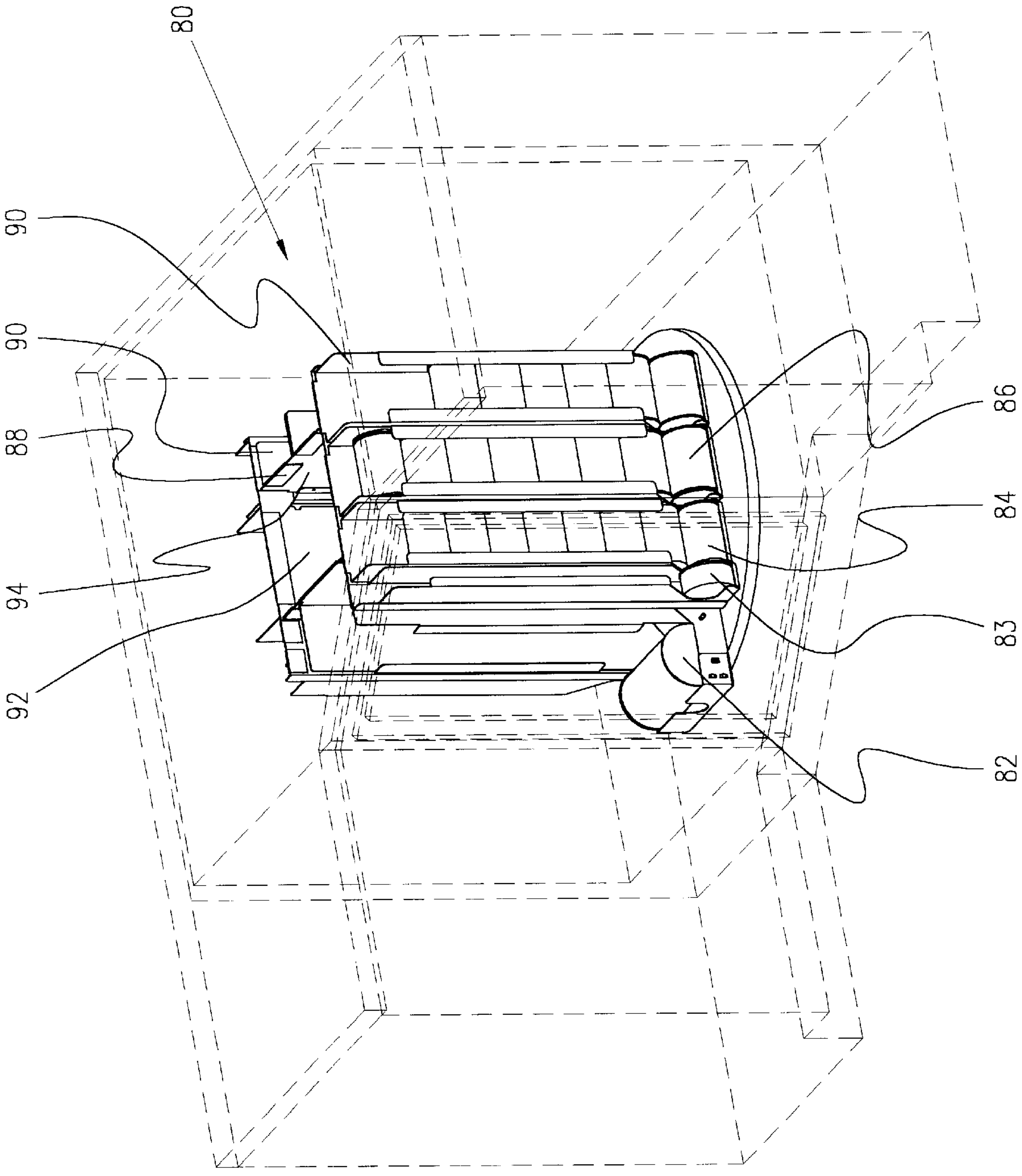
FIG. 4 is a front isometric view of the preferred embodiment can dispenser within a corner cabinet.

FIG. 4 illustrates the interchangeability of a preferred embodiment lazy susan can dispenser 80 located within a corner cabinet (in phantom). The large juice size cans 82 are shown on left. Tuna cans 83, soup cans 84, and bean cans 86 on the right. This embodiment of dispenser utilizes a hem 88 for fastening can channels 90 to the frame sides 92 and frame ends 94. The hems 88 are formed by bending over a tab or top edge of each channel so as to have a slot that will slip over a top edge of sides 92 and ends 94. It can be seen that the location of the different size can channels 90 are easily interchanged.

Figure 5:
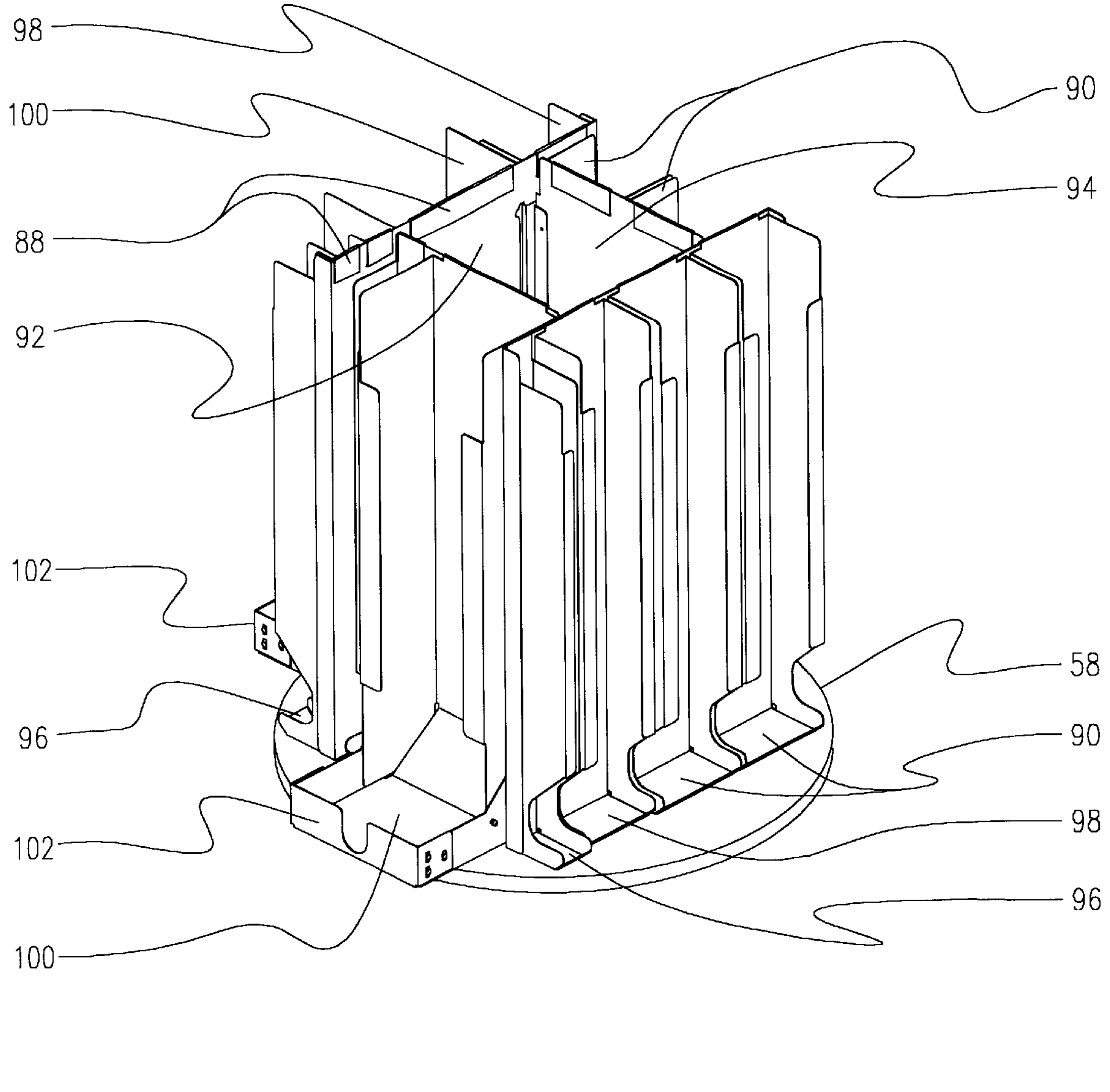
FIG. 5 is a front isometric view of the preferred embodiment of the invention.

FIG. 5 illustrates the assembly of the dispenser 80. The various can size channels are shown clipped by their individual hems 88 to the frame sides 92 and frame ends 94. This view shows tuna can channels 96, soup can channels 98, bean can channels 90 and juice can channels 100. The juice can channels 100 require a roll stop 102 to retain the cans and a roll guide 56.

Figure 6:
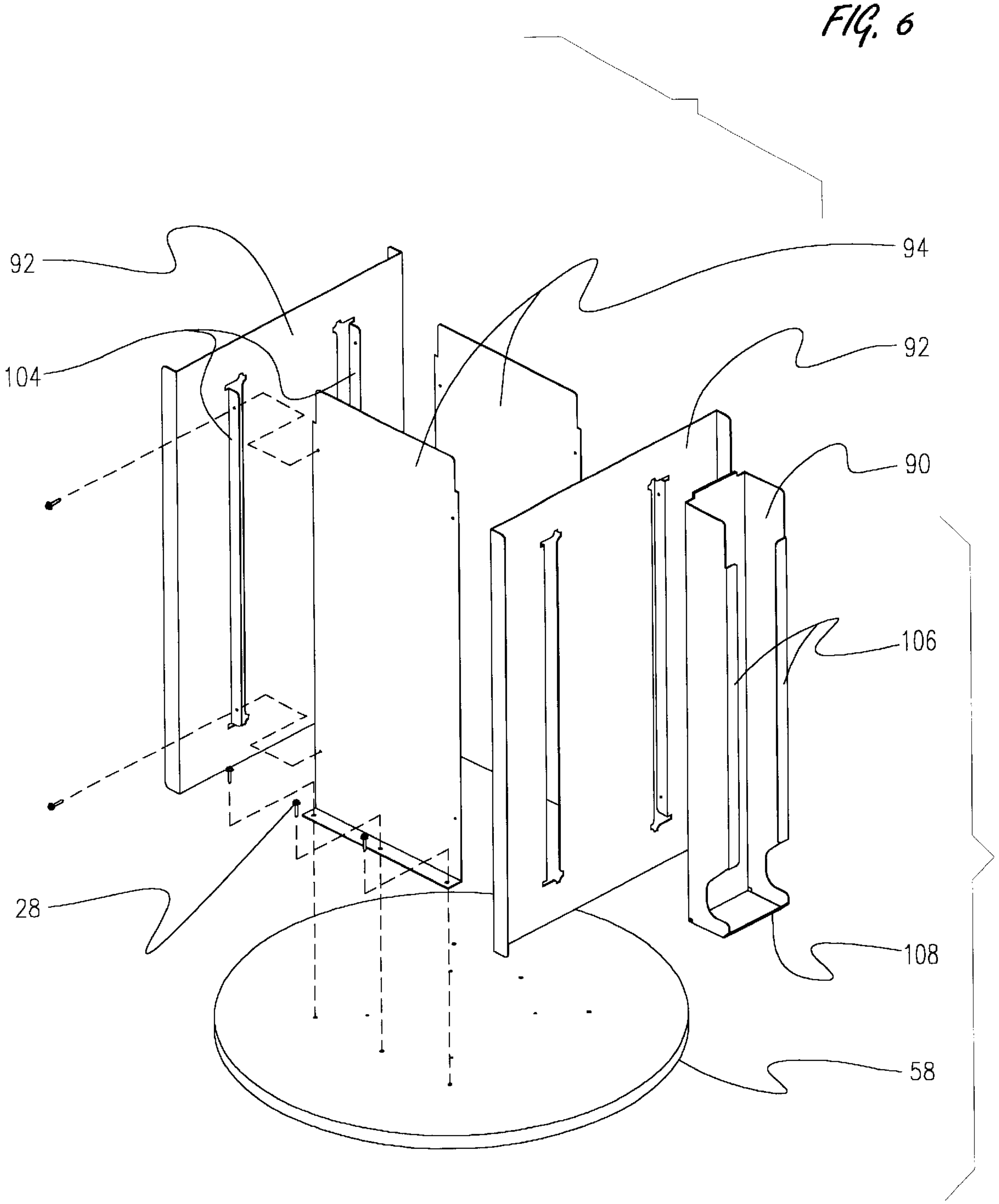
FIG. 6 is an exploded isometric view of the preferred embodiment can dispenser.

The frame ends 94 are attached to base lazy susan by six (6) screws 28 as illustrated in FIG. 6. The frame sides 92 attach by four (4) screws 28 at guides 104 to the frame ends 94. Guides 104 are an extrusion from frame sides 92. The figure illustrates one can channel 90 removed from its adjacent frame side 92. Each of the channels have a side flange 106 to retain the cans in the channel and a bottom roll lip 108 to retain the bottom can.

Figure 7:
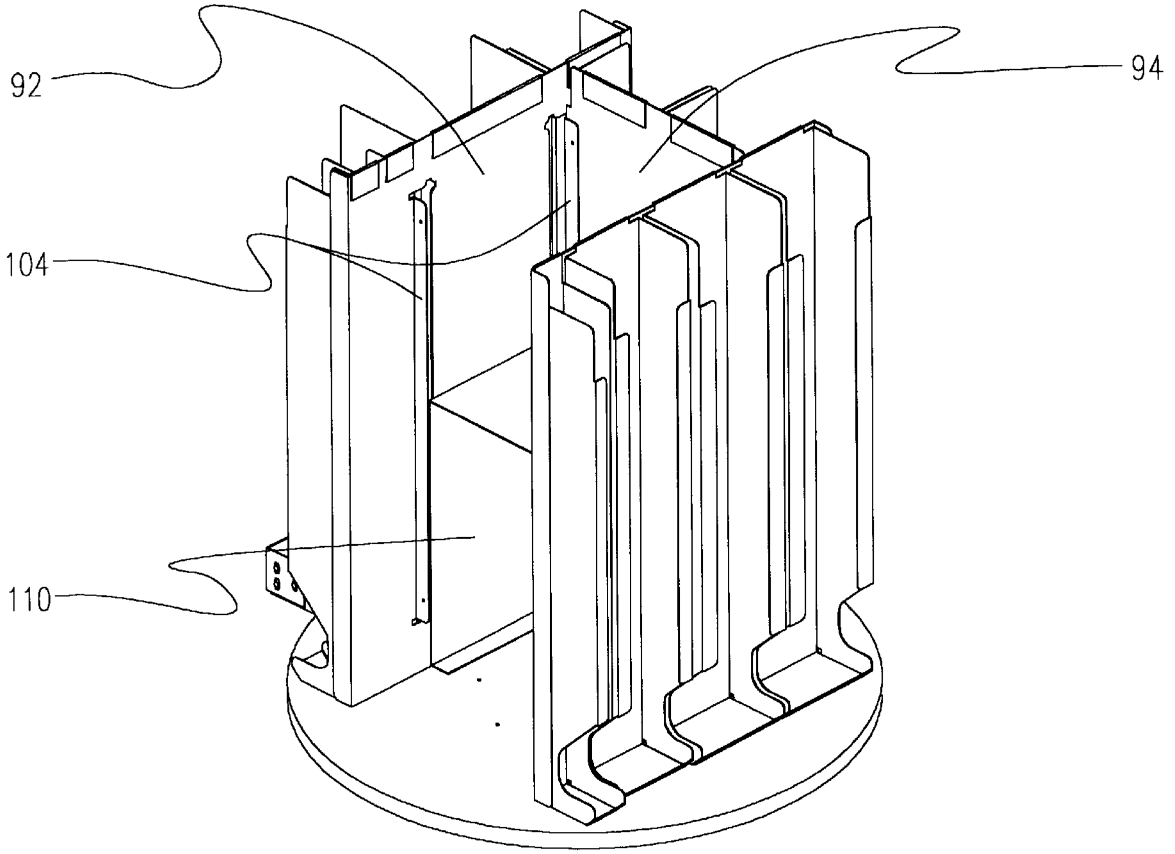
FIG. 7 is a front isometric view of the preferred embodiment can dispenser having a shelf section.

FIG. 7 illustrates the use of a shelf 110 that can be installed in place of one frame end 94. The shelf 110 is dimensioned to slide down between the guides 104 and can be used for stacking vertical goods.

Figure 8:
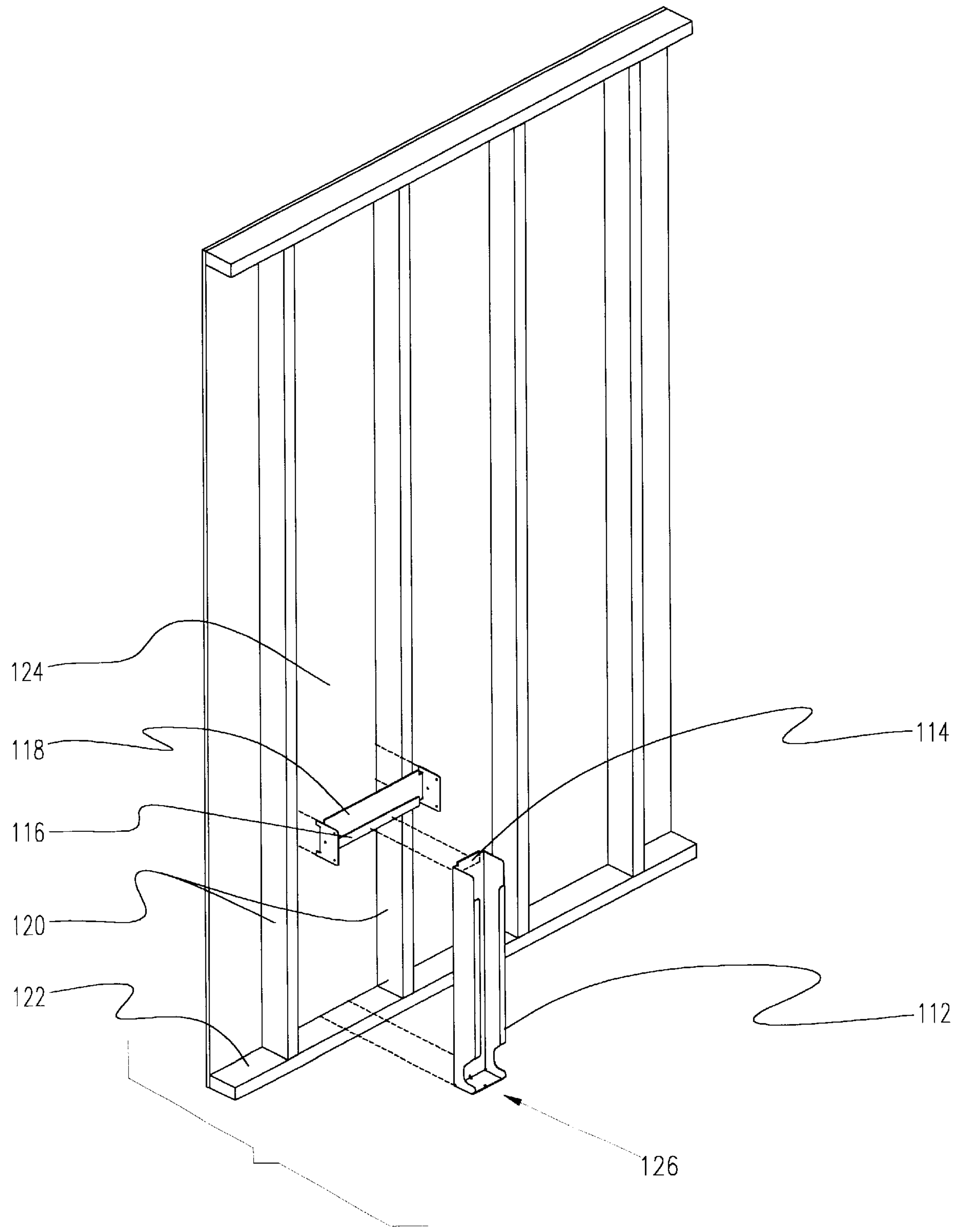
FIG. 8 is a front isometric view of a can dispenser within a wall section.

FIG. 8 illustrates an optional use for the can dispenser. The can channel 112 which can be various sizes hangs by its hem 114 on a vertical open top hem 116 on wall bracket 118. This bracket 118 is nailed between the typical 16" wall studs 120 at a proper distance above the sole 122. It can be seen there is room on the bracket 118 for additional can channels and room for additional brackets above bracket 118 and in an adjacent wall section. The bottom of channel 112 can be nailed to the wallboard 124 or the sole 122 through nail holes 126 in the bottom of channel 112.

Figure 9:
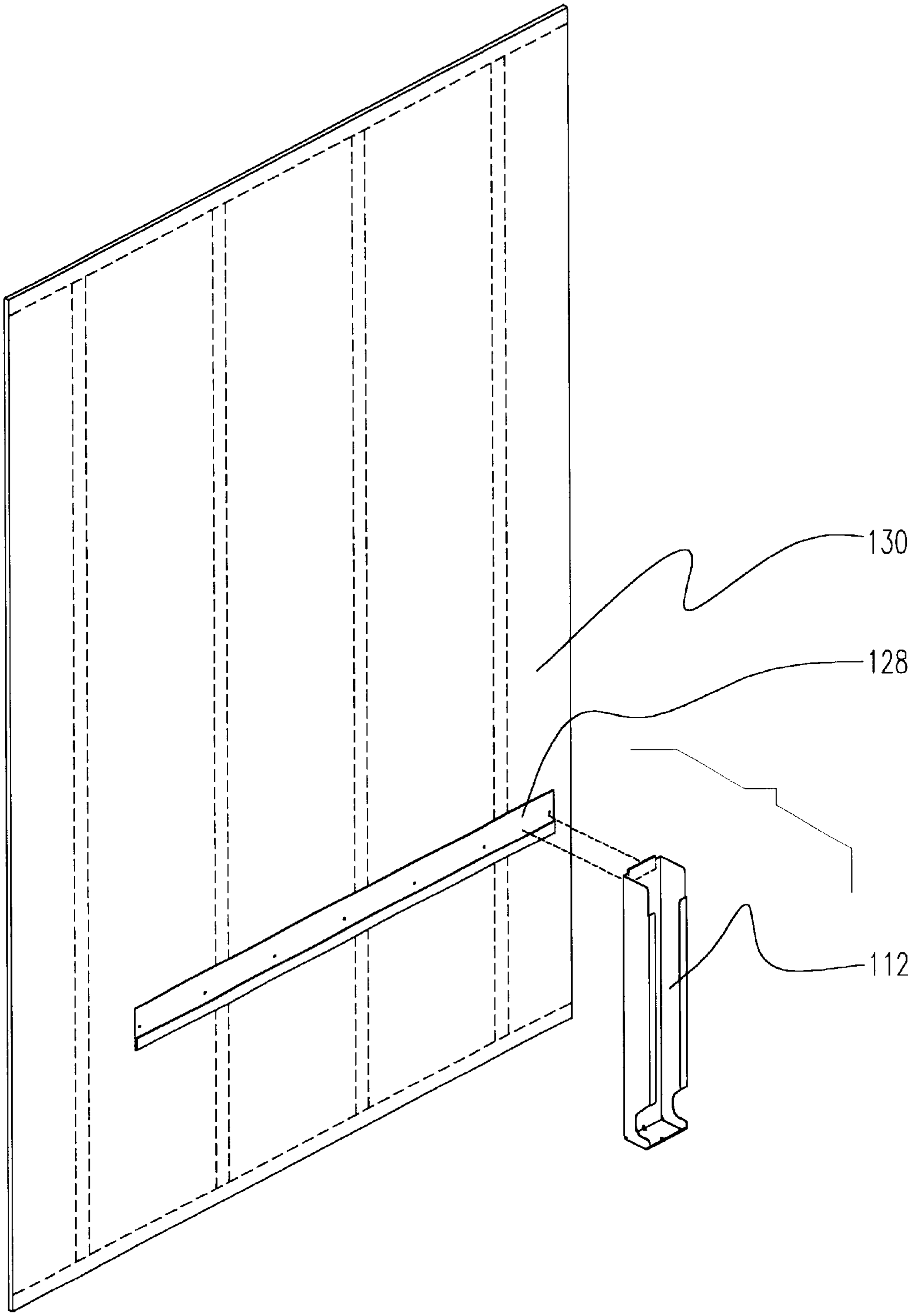
FIG. 9 is a front isometric view of a can dispenser mounted on a wall section.

FIG. 9 illustrates another option for the can channel 112. This unit can be mounted on a flat wall using flat hemmed bracket 128 which is nailed to wallboard 130. This bracket permits hanging of many can channels.

Figure 10:
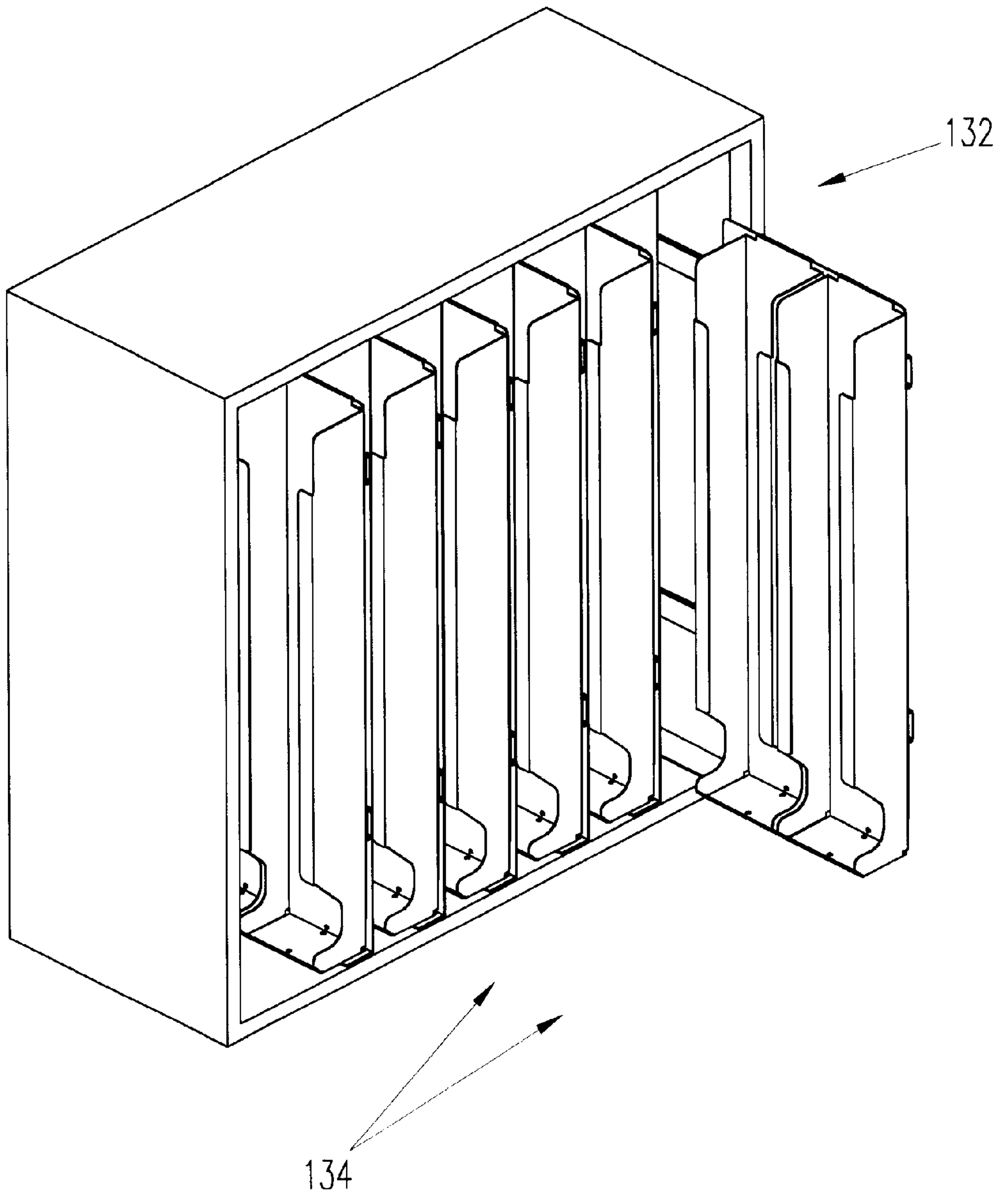
FIG. 10 is a front isometric view of a cabinet mounted can dispenser.

FIG. 10 illustrates another cabinet can dispenser 132 which can be wall mounted. This unit holds multiple can dispenser assemblies 134.

Figure 11:
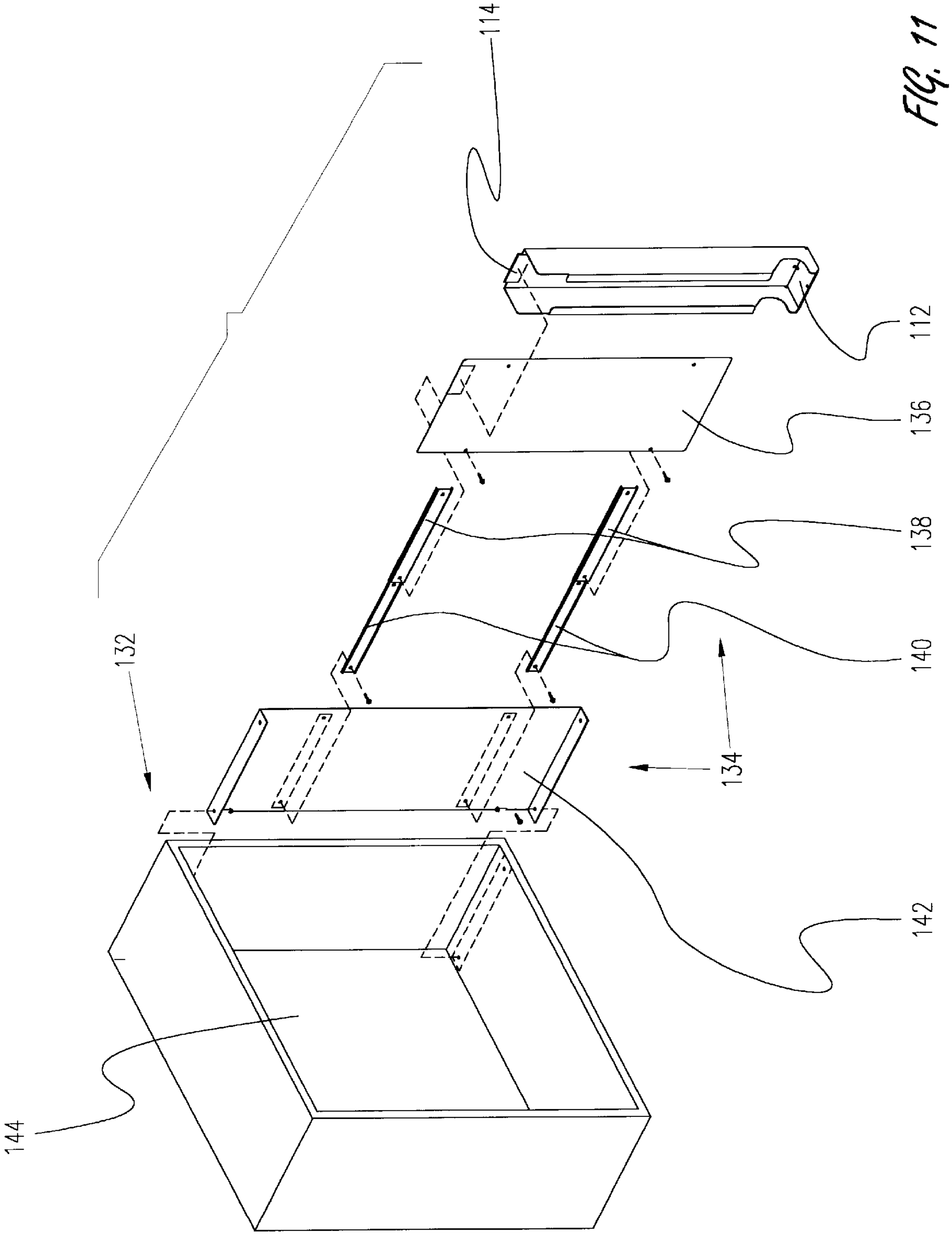
FIG. 11 is an exploded view of the cabinet mounted can dispenser.

FIG. 11 illustrates the details of the cabinet can dispenser 132. The can dispenser assembly 134 consists of a can channel 112 mounted on a vertical panel 136 which in turn attaches to movable slide rails 138. Movable rails 138 slide on fixed rails 140 which attach to rail support panel 142.

Multiple rail assemblies 134 can be mounted within this can dispenser 132 by attaching the rail support 142 to the cabinet 144. The can channels 112 are hung on the frame plate 136 by hem 114, as in other previous can dispensers.

The can dispensers are formed from steel (painted) or galvanized steel.

The previously noted can dimensions are used to determine the depth and width respectively for the can channels. Cans that are slightly smaller than these dimensions still can be held in the channels.

The preferred embodiment illustrated in FIGS. 4–11 offers ease of manufacture assembly and ease of changing channel can sizes, i.e. interchangeability.

The first embodiment in FIGS. 1–3 offers a simple system providing interchangeability and flat assembly parts that are easier for shipping.

What is claimed is:

1. A vertical storage, multiple size can dispenser comprising:

a) a lazy susan;

b) a base attached to the lazy susan;

c) two frame ends affixed to the base;

d) two frame sides affixed to the frame ends;

e) multiple channel shape sections removably and interchangeably affixed to the vertical panels wherein the channel shape sections have multiple depth and width dimensions thereby capable of retaining multiple size cans, wherein a hem section at the top of the channel section clamps over the top of the frame sides and frame ends, thereby supporting the channel sections, and wherein the dispenser is assembled within a corner cabinet.

2. A multiple size can dispenser further comprising:

a) a cabinet;

b) multiple rail support panels affixed within the cabinet;

c) multiple slidable and fixed rails affixed to the rail support panels;

d) multiple vertical panels affixed to the slidable rails; and e) multiple interchangeable channel shape sections further comprising a one piece channel having a back section, the top of the back section having a hem that clamps over the top of the vertical panels thereby supporting the channels.

3. A vertical storage, multiple size can dispenser comprising:

a) a base having multiple slots;

b) multiple slotted vertical panels slidably inserted into the base slots;

c) multiple vertical end panels slidably inserted into the base slots and the vertical panel slots;

d) multiple vertical spacer panels slidably and interchangeably inserted into the base slots and vertical panel slots and end panel slots, said spacer panels thereby capable of retaining multiple size cans.

4. The can dispenser of claim 3 wherein the base attaches to a lazy susan rotary base.

5. The can dispenser of claim 3 wherein the dispenser is assembled within a corner cabinet.

6. A vertical storage, multiple size can dispenser comprising:

a) a base;

b) multiple vertical panels affixed to the base, the vertical panels further comprising:

i) two frame ends affixed to the base; and ii) two frame sides affixed to the frame ends; and c) multiple channel shape sections removably and interchangeably affixed to the vertical panels wherein the channel shape sections have multiple depth and width dimensions thereby capable of retaining multiple size cans.

7. The can dispenser of claim 6 wherein the base attaches to a lazy susan rotary base.

8. The can dispenser of claim 7 wherein a hem section at the top of the channel sections clamps over the top of the frame sides and frame ends, thereby supporting the channel sections.

9. A vertical storage, multiple size can dispenser comprising:

a) a lazy susan;

b) a base attached to the lazy susan;

c) multiple vertical panels affixed to the base, wherein the vertical panels further comprise:

i) two frame sides; and ii) one frame end wherein the frame sides retain a shelf affixed between them; and d) multiple channel shape sections removably and interchangeably affixed to the vertical panels wherein the channel shape sections have multiple depth and width dimensions thereby capable of retaining multiple size cans.

* * * * *